July 21, 1959  H. L. CONRAD ET AL  2,895,759

SEAL

Filed Feb. 17, 1955

INVENTORS
HAROLD L. CONRAD
JOHN E. VANDERBUR JR.

BY

*William L. Lane*

ATTORNEY

United States Patent Office 2,895,759
Patented July 21, 1959

2,895,759

SEAL

Harold L. Conrad, Manhattan Beach, and John E. Vanderbur, Jr., Los Angeles, Calif., assignors to North American Aviation, Inc.

Application February 17, 1955, Serial No. 488,852

4 Claims. (Cl. 288—17)

This invention pertains to a seal and more particularly to a resilient elongated type of seal which can be adapted for high temperature usage.

With the advent of supersonic aircraft and resulting extremes in operating temperatures, previously known firewall seals have proven to be inadequate. Firewall seal design has been a problem even with reciprocating engines, but is aggravated by the even greater temperatures now encountered. It is necessary to seal the elongated gap which extends around a jet engine at the firewall to prevent the passage of flame or liquid through the interior of the fuselage of the airplane. The usual design for firewall seals for jet aircraft installation comprises a coating of asbestos impregnated with a material such as neoprene, surrounding a core of metallic material, for example a knitted Inconel wire. Although relatively quite heavy, these seals have been satisfactory for some low temperature installations, but do not have resilience at extreme temperatures for more severe operating conditions, and they are permanently stiffened after exposure to temperatures of around 300° F. In fact in all of the various factors mentioned in this specification as desirable for a universal and successful firewall seal, the old type of metal base firewall seal has proven inferior. In addition to the ability of the seal to withstand high temperatures, other factors are likewise of great importance. Among these are fluid imperviousness, resistance to abrasion, resilience under all temperature conditions, minimum compression modulus and the lowest possible weight. The seal of this invention provides these and other desirable features by means of a glass fiber core impregnated with a suitable material and surrounded by an impregnated glass cloth cover.

Accordingly it is an object of this invention to provide a resilient seal member for elongated gaps. Another object of this invention is to provide a seal which is resistant to abrasion. A further object of this invention is to provide a seal adaptable for high temperature usage. Yet another object of this invention is to provide a seal which is impervious to fluid, light in weight, and which will provide good service life. These and other objects will become apparent from the following detailed description taken in connection with the drawing in which Fig. 1 is an elevational view of a segment of the seal having an arcuate form;

Figures 1, 2:
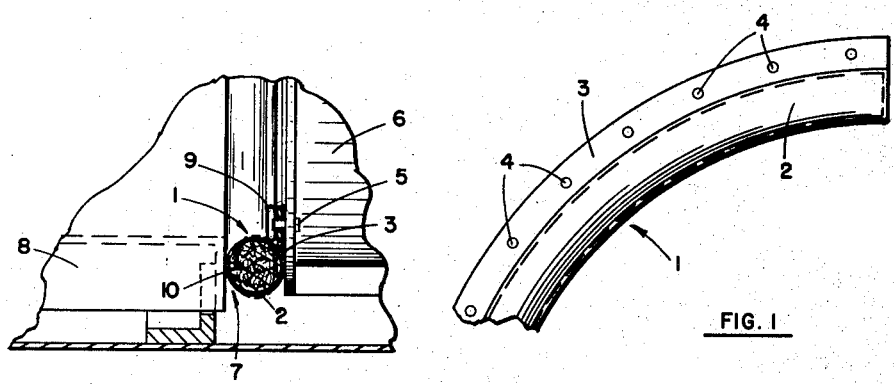
Fig. 2 is a sectional view illustrating the seal installed at an engine firewall.

The seal of this invention may be formed in a variety of shapes so that it is adapted to fill in and seal the elongated gaps such as may be encountered at the firewall in a jet aircraft installation. Thus as shown in Fig. 1 seal member 1 is given an arcuate form which is substantially complementary to the annular gap which may be found between the exterior of a jet engine installed in an aircraft and the fixed structural portions of the aircraft. The seal comprises a substantially tubular main portion 2 and a flap portion 3 extending therefrom having apertures 4 therein for the reception of fasteners to permit installation of the seal. A typical arrangement of the seal in use may be found in the fragmentary showing of Fig. 2. It may be seen that fasteners 5 extend through openings 4 in the flap portion 3 of the seal, attaching the seal in this manner to the exterior of jet engine 6. The seal thereby fills in the gap 7 between the engine and fixed portions 8 of an aircraft structure. In order to avoid damage to the flap 3 a metallic clip 9 may be provided beneath the head of fasteners 5, thereby distributing the force of the head over a large area.

Figures 3, 4:
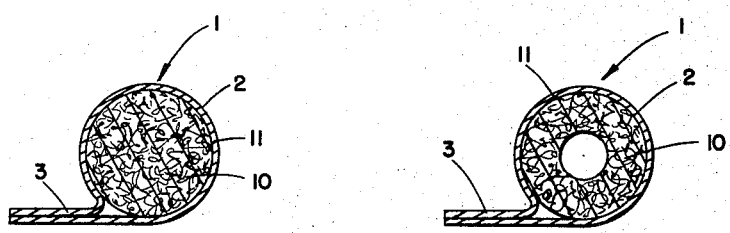
Fig. 3 is an enlarged sectional view illustrating the components of the seal.
Fig. 4 is an enlarged sectional view of a modification of the invention.

The structural arrangement of the seal itself may be seen by reference to Fig. 3. The main portion 2 of the seal includes a core 10 which is made up of flexible glass filaments or particles, such as fibers in the form of a mat or wool, impregnated with a resilient material. The core is preferably given a cylindrical form as illustrated. Surrounding the core in intimate contact with the exterior thereof is a cover 11, also being made of impregnated flexible glass elements, preferably in the form of a woven glass cloth. Flap portion 3 may be an extension of the ends of the cloth 11 which forms the cover.

The use of glass fiber for the core is ideal for several reasons. In the first place it is compressible so that the seal may be made to fill the gap 7 regardless of the temperature or other conditions which will be encountered in use. Of course the glass of the core is resistant to temperatures above those which will be encountered by the seal. Ordinary glass is presently adequate, but for more extreme conditions quartz glass could be employed. Furthermore, glass fiber material is light in weight and the density of the material can be accurately controlled.

However, glass fiber by itself would be inadequate for the core material and would not provide a successfully operable seal. Alone this material does not have sufficient body or shape to act as a core material and would soon break up upon usage. Therefore it is necessary to impregnate the glass fiber with a suitable material to overcome some of its defects. In other words, properly impregnated the glass fiber should have body so that it will assume a given shape and retain this configuration. The glass fiber should be resilient so that it may be compressed and when released return substantially to its original form. Also it should withstand high temperatures and retain its resilience through a wide range of temperatures and long periods of time. Of course it should be light in weight, and when used with the glass core should require a minimum compressive force. A resinous material satisfactorily meets the above mentioned qualifications. Core element 10 in the preferred embodiment therefore comprises a mat of glass fibers which have been impregnated with a resinous material. Any of several resins may be used, it being naturally important that a resin which will withstand high temperatures be selected. A silicone resin is good for this purpose and high temperature phenolic resins are also quite suitable.

The cover element 11 must also withstand high temperatures, must of course be flexible to permit the compression of the seal, should not be attacked by fluids, nor should it be absorptive thereof. It must be of a sufficient durability to resist tearing, snagging and abrasion during normal handling, assembly and use. The glass cloth of the cover, although able to withstand temperature extremes, would not be impervious to liquids and would have other undesirable features when used alone. Therefore the cover is impregnated, in the preferred embodiment, with polytetrafluoroethylene, known commercially as Teflon, which is cured after the core is within the cover. This combination provides a seal of unusual characteristics. Despite the fact that there may be considerable difference in the expansion of the engine and the fixed portions of the aircraft structure so that the firewall seal will be scraped along the surface of the structure and will be severely compressed, service life of over 100 hours is easily possible with the seal of this invention. The Teflon impregnated glass cloth cover will not absorb or be attacked by fuel or oil and will withstand extremely high temperatures for considerable periods of time. Not only will the seal of this invention not support combustion of its own, but it will withstand a flame of 2000° F. for periods upwards of fifteen minutes without failure and without allowing blow-by of the flame.

The importance of a low compression modulus can be appreciated by referring to one jet aircraft where the structure surrounding the seal is designed to withstand ten pounds per lineal inch. The load imposed on the structure by compression of the seal of this invention to 50 percent of its original diameter is only around seven pounds per lineal inch. The prior art seal having a knitted wire core would have imposed a 40 to 50 pounds per inch loading on the structure, obviously requiring redesign, increased weight and expense. Such a seal also raises major installation problems.

The seal of this invention is not only readily compressible, but almost no permanent set will be obtained even through the seal is used at high temperatures and compressed fifty percent or more of its normal outside diameter. For example, in one installation the differences in expansion at temperatures at which the seal is used compress the seal, normally one inch in exterior diameter, to one-half inch in thickness. Nevertheless the seal will recover virtually to its original form when it is released as the temperatures are lowered, so that a perfect seal is obtained through the entire operating range of the aircraft and an extended service life results. Not only is the seal fully resilient and flexible at extremely high temperatures but it retains its flexibility at temperatures of −65° F. or lower. The latter is of importance because aircraft using the seal may be stationed in polar regions where such temperatures are encountered. Vibration resistance is another necessary feature for a successful firewall seal and the seal of this invention is not affected by the vibration encountered in aircraft uses. While the seal is not a large member, it may extend for considerable lineal distance throughout the aircraft in various locations so that its density is critical from a weight standpoint. The core material used with the seal of this invention has a density of only six pounds per cubic foot. This contrasts startlingly with a previously widely used seal which has a density of seventy pounds per cubic foot. As mentioned before, the Teflon impregnated glass cloth cover is quite abrasion resistant this being one of the most severe problems which any seal has to overcome. Teflon acts to some extent as a self-lubricant which lessens the possibility of damage from abrasion. It is therefore apparent that the seal of this invention is ideally suited as a firewall seal for a modern jet propulsion aircraft.

The basic flexibility, resilience, light weight and fluid resistance of this seal make it suitable for other purposes as well. It is successfully used as an air guide seal. Another example is use as a seal around an aircraft canopy. For such purposes it may not be necessary to use materials of such high temperature resistance as used for a firewall seal. Neoprene or other synthetic rubber may be used to impregnate the cover where the temperature range is not too great, although these materials are not as inert chemically as Teflon.

The modification of Fig. 4 illustrates a core having a hollow center which may be used where a high degree of resilience is important. Obviously the hollow core means that less effort will be required in compressing the seal. Otherwise, the construction of the seal may be substantially the same as for the previously described embodiment.

Figure 5:
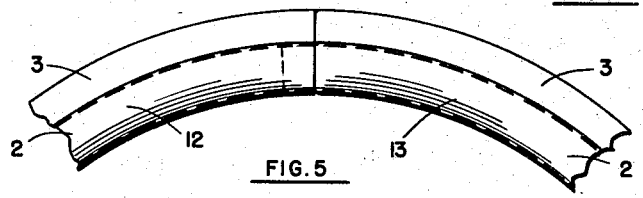
Fig. 5 is an assembly view of a joint between seal segments.

When the seal of this invention is installed it is normally necessary to assemble it in sections rather than to provide a single seal element. Thus, for example, in a typical installation of the seal at the firewall for a jet aircraft engine, size and space limitations may necessitate assembling the seal from three separate pieces. The seal must nevertheless prevent passage of flame or liquid or the like at the joints between the three seal sections just as the remainder of the seal must prevent such occurrence. This may be accomplished by the arrangement illustrated in Fig. 5 where a recess is formed in the end of one segment 12 of the seal by extending the cover portion of the seal beyond the end point of the core material. The end of the adjoining segment 13 of the seal is then inserted within the receptacle formed in the segment 12 to thereby provide a unitary continuous joint for the sealing element.

However, when this arrangement is used alone a serious disadvantage results. This is the fact that the joint, as described, is not impervious to fluids which may pass beneath the overlapping portions of the cover element and thereby reach the inner core portion 10. By nature of the core as formed from impregnated glass fibers, the fluids which will thus pass through the joint can be readily drawn into the core through capillary attraction. Thus, for example, if the joint were to soak up hydraulic oil which had leaked around the firewall of a jet engine, the heating of the seal from the engine might cause ignition of the oil which could thereby burn out the interior core portion of the seal. The overlapping cover portions cannot normally be cured in place and thereby fused together, because controlled heat cannot be applied to the seal after installation.

Therefore, it is preferred to seal the ends of the adjoining segments of the seal to prevent passage of fluids to the core elements thereof. This may be accomplished by the arrangement of Fig. 6 or that of Fig. 7. According to the arrangement of the former figure, a cap portion is provided for each of the seal segments. The cap for the recessed end of segment 12 comprises a substantially cup-shaped element 15 which is complementary to the contour of the recess in the end of the seal element. Member 15 comprises glass impregnated with Teflon, and may be substantially the same material as that used for the cover. When the seal segment is cured element 15 will become integral with the remainder of the seal thereby providing a fluid impervious end for the core. In a similar manner, a cap 16 is provided over the end of segment 13, the latter cap element being likewise cup-shaped but designed to fit over the outside of the end of the seal segment. This is also glass cloth impregnated with Teflon and when the seal is cured it is thereby made an integral portion of the seal and will prevent transmission of fluid to the core element of this seal segment. With this arrangement, when the seal element 13 is inserted within the receptacle in element 12, no fluid can reach the core and the core thereby will not be subjected to the possibility of becoming saturated with a fluid which engages the seal. Because of the fact that the seal is compressible and the cover elements are relatively thin, there is no difficulty in inserting the end of seal element 13 within the receptacle in element 12.

Figures 6, 7:
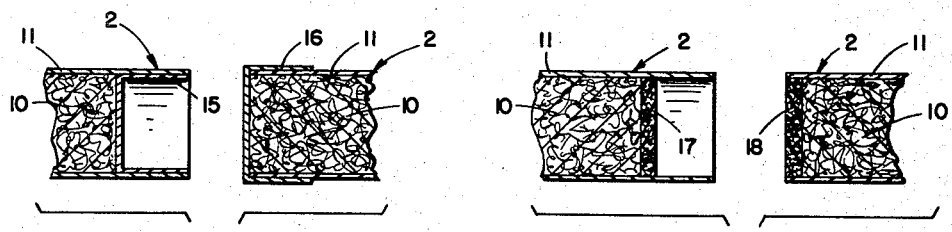
Fig. 6 is an enlarged detail sectional view of an arrangement for preventing entry of fluid into the seal through a joint.
Fig. 7 is a modified form of the arrangement of Fig. 6.

The arrangement of Fig. 7 has some advantage from the standpoint of durability through repeated flexing. With this modification the means of preventing fluid from entering the core comprises a plug of glass fiber material impregnated with Teflon. Thus, for segment 12, the recessed portion is fitted with a disc-like element 17 fitting within the receptacle portion, this element being glass fibers impregnated with Teflon which, when cured, will become integral with the remaining portion of the seal. Segment 13 is likewise recessed a slight amount so that it will receive disc-like plug element 18, also of glass fibers impregnated with Teflon. No buckling will occur when glass fibers are used as the means of closing off the ends of the seal segments. It is slightly more difficult, however, to provide a completely fluid impervious member when glass fibers are used rather than glass cloth. In any event, the glass fiber plug elements become a suitable base for an overlay of other sealant material should they fail to completely close off the ends of the seal segments.

It is apparent from the foregoing that we have provided an improved seal element which is particularly adaptable for high temperature use, or usage wherever a fluid impervious, resilient sealing member is necessary. The abraision characteristics, weight and other factors necessary for a seal of this type are all inherent in the design of this invention.

The foregoing detailed description is to be clearly understood as given by way of illustration only, the spirit and scope of this invention being limited only by the appended claims.

We claim:

1. A segmented seal comprising an elongated core of flexible glass fibers impregnated with a resilient resinous material, and a cover of glass fabric impregnated with polytetrafluoroethylene over the exterior of said core, adjoining segments of said seal being constructed and arranged with the cover at the end of one of said segments projecting beyond the core thereof providing a receptacle receiving the end of the adjacent segment to form a joint therewith, the end of the core of each of said segments being provided with a closure of resilient glass construction impregnated with polytetrafluoroethylene and fused to the cover therefor, thereby to preclude entry of fluid into said core.

2. An elongated seal of at least two segments, each of said segments comprising a resilient flexible glass core impregnated with a heat resistant resilient material, and a flexible glass cover around said core impregnated with a fluid impervious flexible material, the end of one of said segments being arranged with the cover projecting beyond the core thereby forming a recess for receiving the end of the other segment to form a joint therewith, each of said ends of said segments being provided with a flexible glass closure coated with a fluid impervious flexible material and sealingly arranged with the cover thereby to preclude entry of fluid into said core.

3. A firewall seal comprising an elongated cylindrical core of glass filaments arranged in a flexible mat and impregnated with a heat resistant material having properties to give body and resilience to said core, and a complementary cover surrounding said core in a sealed relationship therewith, said cover being of woven flexible glass elements impregnated with a flexible heat resistant fluid impervious material, said core and the cover being in at least two segments having adjacent ends, the cover of one of said segments extending axially beyond the core thereof to provide a receptacle for receiving the end portion of the adjacent segment, each of said end portions being provided with a sealing means over the end of the core thereof comprised of resilient glass elements coated with a flexible heat resistant fluid impervious material and sealingly engaging the cover therefor.

4. An elongated seal having at least two end portions, said seal comprising a resilient flexible glass core impregnated with a heat resistant resilient material, and a flexible glass cover around said core impregnated with a fluid impervious flexible material, one of said end portions being arranged with the cover projecting beyond the core thereby forming a recess for receiving the other of said two ends to form a joint therewith, each of said end portions being provided with a flexible glass fiber closure impregnated with a fluid impervious flexible material and sealingly arranged with the cover to preclude entry of fluid into said core.

References Cited in the file of this patent

UNITED STATES PATENTS

| | | |
|---|---|---|
| 1,533,490 | Wirfs | Apr. 14, 1925 |
| 2,144,082 | Randall | Jan. 17, 1939 |
| 2,459,720 | Poltorak | Jan. 18, 1949 |
| 2,484,693 | De Witt et al. | Oct. 11, 1949 |
| 2,686,747 | Wurtz et al. | Aug. 17, 1954 |
| 2,717,025 | Jelinek | Sept. 6, 1955 |

FOREIGN PATENTS

| | | |
|---|---|---|
| 844,748 | France | Apr. 24, 1939 |
| 993,123 | France | July 18, 1951 |

OTHER REFERENCES

Gaskets (Elonka), published in Power, March 1954; pages 109–115 of Plant Operation and Maintenance Section.